United States Patent Office 3,163,235
Patented Dec. 29, 1964

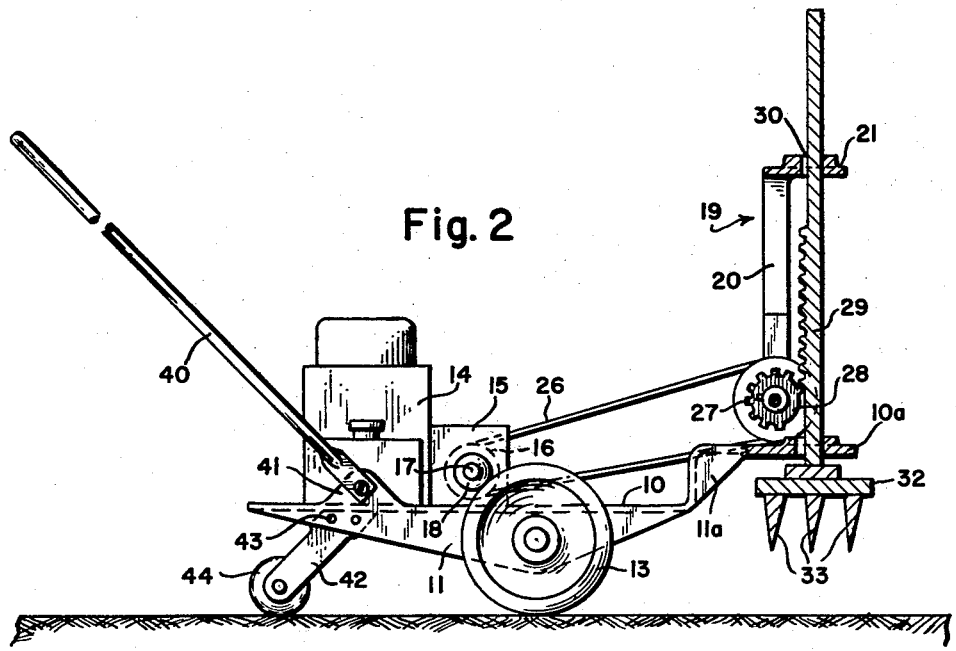
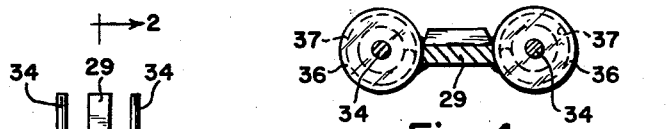
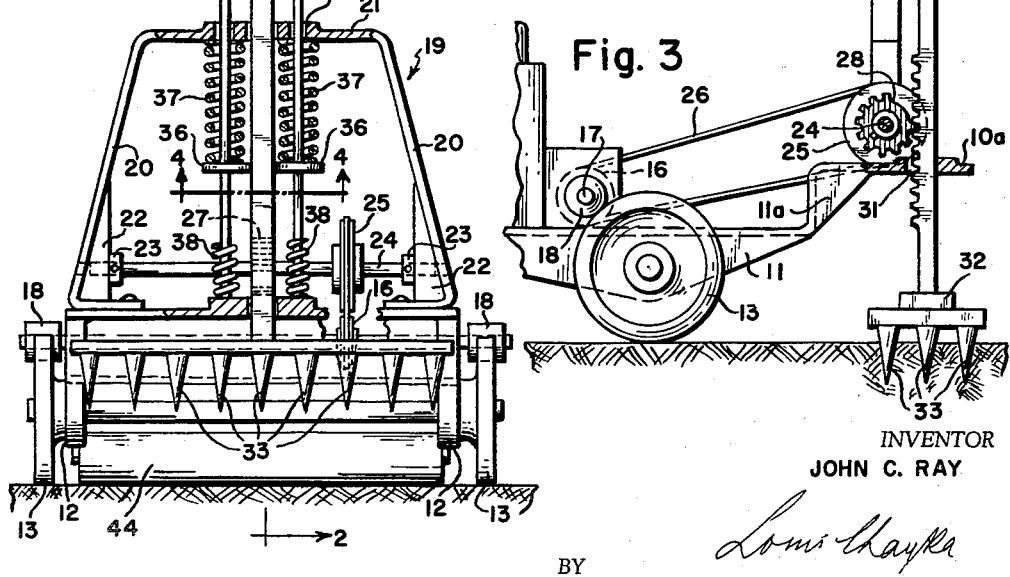
INVENTOR
JOHN C. RAY
ATTORNEY

3,163,235
SOD SPIKING MACHINE
John C. Ray, 1302 Lafayette Bldg., Detroit 26, Mich.
Filed Oct. 30, 1962, Ser. No. 234,101
2 Claims. (Cl. 172—21)

The object of the invention is to provide a machine capable of perforating top soil in order to aerate the same. The machine is designed for use on lawns, the specific object of the invention being to provide a compact mechanism of low weight, one operable by a low power motor and capable of perforating the soil or more specifically the sod, by means of an array of spikes mounted on a horizontal bar which is adapted to be reciprocated vertically. The operative elements of the machine are mounted on a platform supported by ground wheels, the whole machine being preferably self-propelled for movement upon a lawn.

A further object of the invention is to provide a machine of simple structure, one which calls for a minimum of operative elements but which will be fully practical and useful for the purpose for which it has been designed. The structural design of the machine discloses certain novel features and a novel combination of parts as will be described herein with reference to the accompanying drawings in which, FIG. 1 is a front elevation view of the machine;

FIG. 2 is a side elevational view of the machine but includes at the front end thereof a sectional view taken on line 2—2 of FIG. 1;

FIG. 3 is partly a side elevational and partly a sectional view of the front end of the machine with elements shown in operative positions different than those shown in FIG. 2;

FIG. 4 is an enlarged sectional view taken on line 4—4 of FIG. 1.

Similar numerals refer to similar parts throughout the several views.

The machine includes a flat platform, the main portion of which is marked 10, this being the rear portion while the front portion 10a is raised to a level above that of the portion 10. On each side the main portion 10 is provided with a downwardly turned flange 11, each of said flanges being provided with a bearing 12 for support of a ground wheel 13. The ground wheels are preferably equipped with conventional solid rubber tires. The elevated front portion 10a of the platform is supported by side flanges 11a.

Mounted on the main portion 10 of the platform is a motor 14, a part of which is a gear box 15. Driven by said motor by means of a gear assembly in said gear box 15 is a pulley 16 which is axially keyed to a horizontally disposed shaft 17 projecting from the gear box transversely with respect to the length of the platform. The same shaft carries at each end a roller marked 18 for frictional contact on each side of the platform with the periphery of the respective rubber tire on the wheel on which the tire is mounted.

Mounted on the raised portion of the platform 10a, is a frame in the shape of an inverted letter U, the frame being generally indicated by numeral 19. It includes two upwardly extending legs 20 and a horizontal top member 21 which is disposed transversely to the length of the platform. At the lower end each of the leg carries a bearing 23 for support of a horizontal shaft 24, the bearings being horizontally aligned. Axially keyed to the shaft is a pulley 25 which by means of a belt 26 is connected to the motor driven pulley 16. The pulley 25 adjoins one of the legs 20. Axially keyed to the same shaft 24, midway its length, is a pinion 27. The latter is of a special design as it is devoid of teeth along a portion of its periphery. This is shown at 28. The pinion is designed to mesh with the teeth of a vertical rack 29. The latter is slideably held at its upper end in a slot 30 in the horizontal top member of a standard suitable for this purpose which in this case is the member 21 of the above named frame 19. The lower portion of the rack passes through a slot 31 in the raised portion 10a of the platform, said slot 31 being vertically aligned with the above named slot 30. At its lower end below the raised platform 10a, the rack 29 supports a horizontal bar 32 which on its under side carries a plurality of downwardly turned spikes 33, these being arranged in a spaced relation to each other. For the purpose of increasing the efficiency of the downward thrust of the spike bar, the latter ought to be of considerable weight. For this reason it is desirable that the bar be of sufficient thickness and that it be preferably made of metal.

Also mounted on the raised platform 10a are two vertical rods 34, one on each side of the rack, the rods being secured to said platform and extending upwardly through apertures 35 in the top member 21 of the frame 19 as shown in FIG. 1.

Secured to the main portion of the rack 29 at a point between the platform 10a and the top member 21 of the frame 19, is a transverse bracket 36 shown in FIGS. 1 and 4. The bracket consists of two disks each having a hole in the center large enough for a sliding engagement with one of said rods 34. The bracket as a whole serves as a support for the two coil springs 37 as shown in FIG. 1. Additionally a short spring of a materially lower resistance to compression is coiled about each of said rods 34 at its lower end, the two springs being marked 38 and being referred to as secondary springs.

To conclude the description of the machine I will refer to the steering handle 40 which is secured to the rear end of the machine by brackets 41, one of which is shown in FIG. 2. Additionally, also secured to the rear end of the machine is a ground roller 44 supported on each side of the platform by a bracket 42 secured to the respective side flange 12 by bolts 43.

To describe the operation of the machine I will start with the assumption that the spike bar 32 is in its low position as shown in FIG. 3. It will be noted that with spike bar in said position, the rack is in mesh with the pinion 27. As the pinion rotates in the counter clockwise direction, the pinion will lift the rack against the tension of the springs 37 which in the course of the upward movement of the rack will result in the compression of said springs against the top member 21 of the frame 19. By the time the spike bar 32 carried by the rack, has reached its uppermost position as shown in FIG. 2, the pinion will be in the position where because of the lacking teeth on said pinion, the rack will be disengaged therefrom. As the result, at the moment of said disengagement, the recoiling springs 37 will thrust the rack with the spike bar downwardly causing the spikes to pierce the sod as shown in FIG. 3. In the course of the downward thrust of the rack, the disks 36 will encounter the secondary springs 38 and compress them against their respective seats. Immediately however, the springs will recoil to impart an initial upward movement to the rack, sufficient enough to disengage the spikes from the sod. Following this initial movement of the rack, the latter, in the course of the rotation of the pinion 27, will be engaged by the teeth of said pinion and raised against the tension of said springs 37 to the position shown in FIG. 2.

As the machine is propelled over the lawn, the roller 44 which serves to support the rear portion of the platform 10 will also serve to level any protruberances caused by the withdrawal of the spikes from the sod.

It will be understood that some changes may be made in the structure of the machine or its co-operating elements without departing from the main inventive concept disclosed therein. What I therefore wish to claim is as follows:

1. In a sod spiking machine in combination:
   (a) a wheeled platform,
   (b) a vertically moveable rack having teeth at one end of said platform,
   (c) a horizontal member secured to the lower end of the rack, the member being equipped with a plurality of spikes extending downwardly therefrom,
   (d) a horizontal shaft adjoining the rack, said shaft being mounted on the platform for rotation about its axis,
   (e) a gear wheel axially mounted on the shaft for rotation therewith, said wheel being devoid of teeth along a portion of its periphery but being adapted in the course of its rotation to mesh its teeth with those of said rack,
   (f) a horizontal frame spaced from and supported by said platform, said platform having an aperture therethrough for slidably receiving and guiding said rack,
   (g) spring retaining rod means mounted on said platform and extending upwardly to said horizontal frame,
   (h) spring compression means on said rack intermediate the ends thereof, said spring compression means being slideable on said rod means,
   (i) primary spring means on said rod means above said spring compression means and adapted to be compressed thereby against said horizontal frame in response to upward movement of said rack, said spring means serving to thrust the rack downwardly on its disengagement with the teeth of the gear wheel to force said spikes into the sod,
   (j) secondary spring means on said rod means below said spring compression means and adapted to be compressed thereby against said platform in response to the final stage of the downward movement of said rack, said secondary spring means serving to impart, on recoil, sufficient upward movement of the rack to disengage said spikes from the sod, and
   (k) means to drive the horizontal shaft.

2. In a sod spiking machine as set forth in claim 1 wherein said means to drive the horizontal shaft is a motor mounted upon said platform.

References Cited in the file of this patent

UNITED STATES PATENTS

| | | |
|---|---|---|
| 13,505 | Bowerman | Aug. 28, 1855 |
| 971,791 | Prisk | Oct. 4, 1910 |
| 1,640,786 | Maheras | Aug. 30, 1927 |
| 2,509,691 | McLemore | May 30, 1950 |
| 2,838,986 | Fessel | June 17, 1958 |

FOREIGN PATENTS

| | | |
|---|---|---|
| 177,155 | France | Mar. 2, 1877 |
| 531,388 | Germany | Aug. 8, 1931 |
| 435,406 | Great Britain | Sept. 23, 1935 |